US005926955A

United States Patent [19]

Kober

[11] Patent Number: 5,926,955

[45] Date of Patent: Jul. 27, 1999

[54] MICROVALVE WITH JOINED LAYERS OF METAL PARTS AND PROCESS FOR MANUFACTURE OF A MICROVALVE

[75] Inventor: Hans-Friedemann Kober, Tuebinen, Germany

[73] Assignee: Robert Bosch GmbH, Stuttgart, Germany

[21] Appl. No.: 08/677,607

[22] Filed: Jul. 8, 1996

[30] Foreign Application Priority Data

Jul. 22, 1995 [DE] Germany .......................... 195 26 897

[51] Int. Cl.[6] .................................................. B29C 45/14

[52] U.S. Cl. ............................... 29/890.127; 29/890.132; 251/61.1

[58] Field of Search ...................... 29/890.122, 890.127, 29/890.126, 890.13, 890.132, 890.124; 251/129.06, 129.01, 61.1; 137/883

[56] References Cited

U.S. PATENT DOCUMENTS

| | | | |
|---|---|---|---|
| 5,082,242 | 1/1992 | Bonne et al. | 251/129.01 |
| 5,142,781 | 9/1992 | Mettner et al. | 29/890.124 |
| 5,647,574 | 7/1997 | Mettner et al. | 251/129.06 |

FOREIGN PATENT DOCUMENTS

| | | |
|---|---|---|
| 42 21 089 A1 | 1/1994 | Germany . |

OTHER PUBLICATIONS

Micro System Technologies 90, 1st Int'l. Conference on Micro Electro, Opto, Mechanic Systems and Components, Berlin, Sep.10–13, 1990, pp. 520–537 (Herbert Reichl, Editor), Springer–Verlag.

*Primary Examiner*—Kevin Lee
*Attorney, Agent, or Firm*—Frishauf, Holtz, Goodman, Langer & Chick, P.C.

[57] ABSTRACT

A microvalve includes a chamber, with a closing member being movable therein. The microvalve is made of two layers. The two layers of the microvalve are formed separately by being impressed as a mold into a moldable material and then filling the mold with metal by a galvanizing process. The two layers are joined together with the aid of a joining layer.

9 Claims, 4 Drawing Sheets

Fig. 2.1
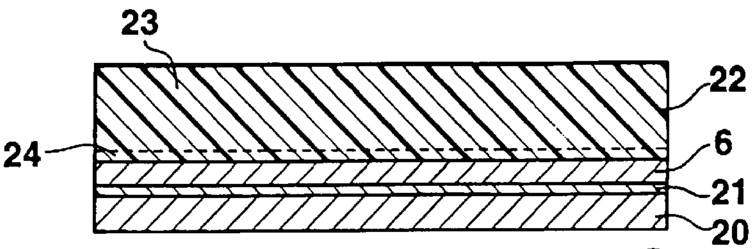
Fig. 2.2
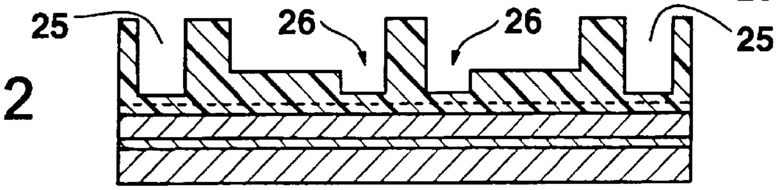
Fig. 2.3
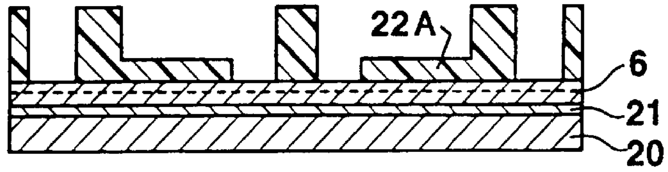
Fig. 2.4
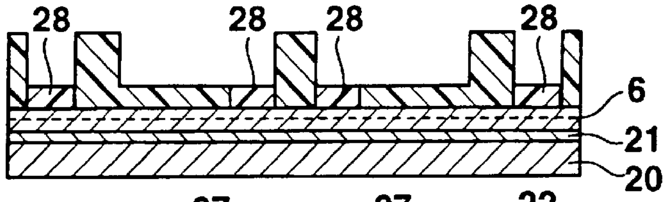
Fig. 2.5
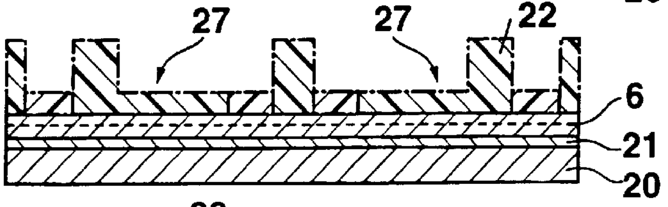
Fig. 2.6
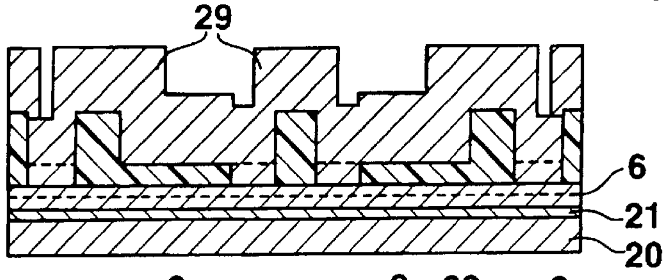
Fig. 2.7
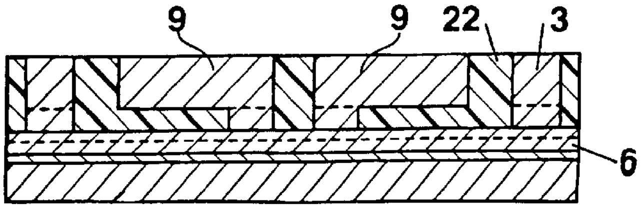
Fig. 2.8
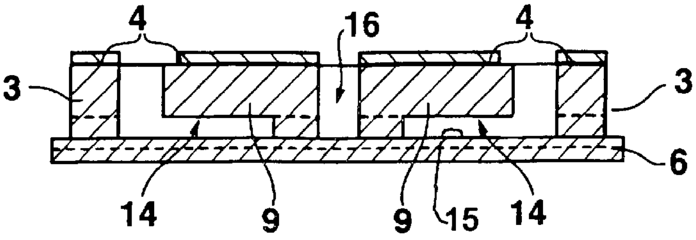

Fig.3.1
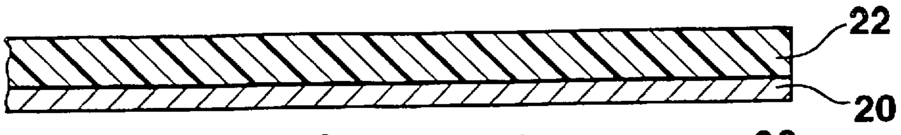
Fig.3.2
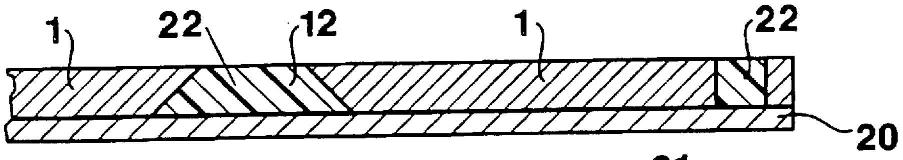
Fig.3.3
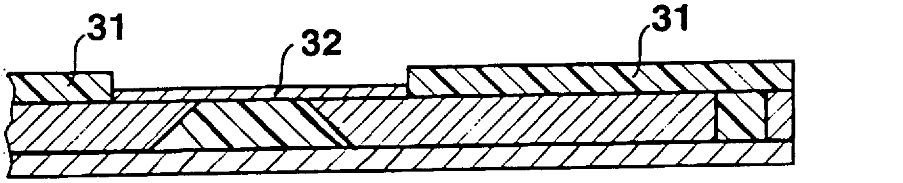
Fig.3.4
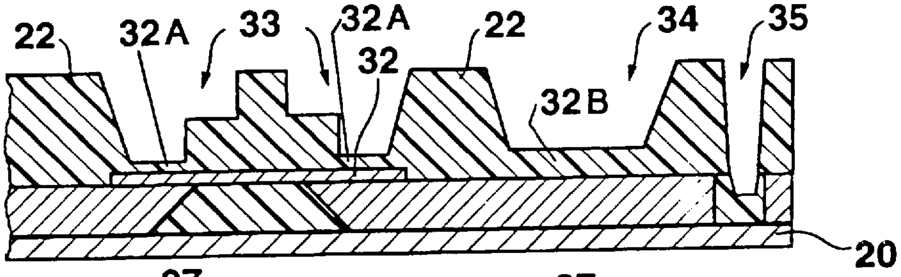
Fig.3.5
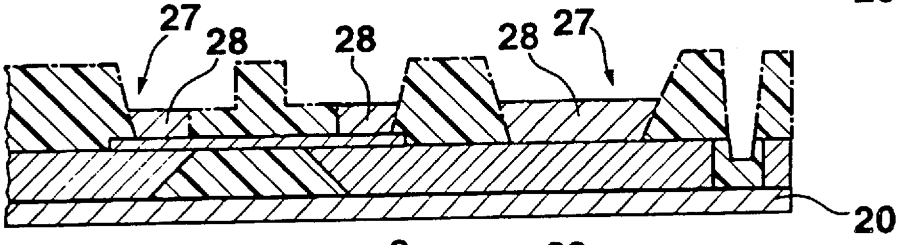
Fig.3.6
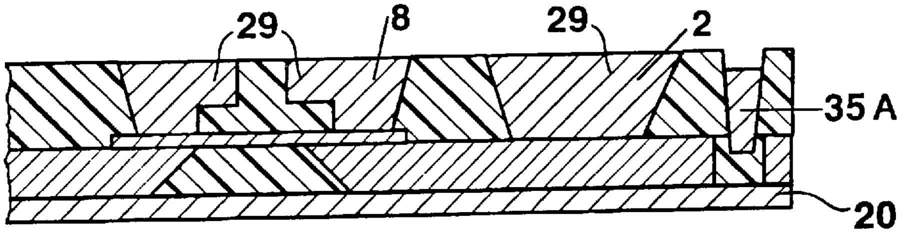
Fig.3.7
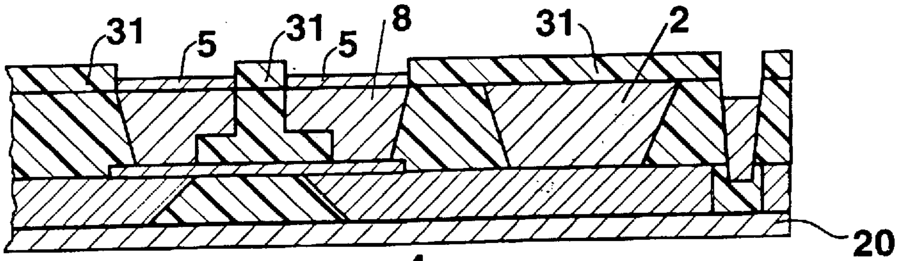
Fig.3.8
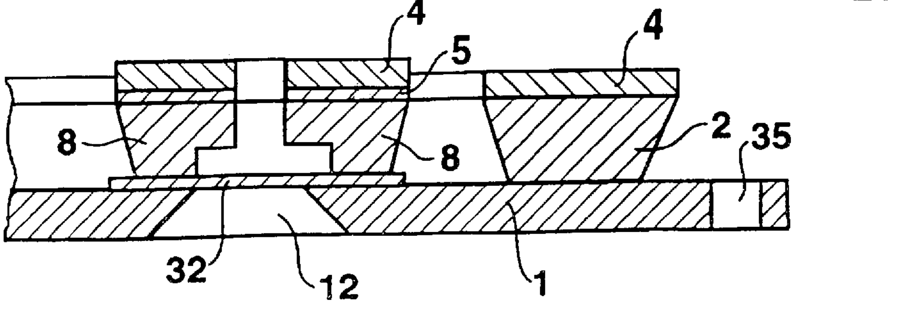

MICROVALVE WITH JOINED LAYERS OF METAL PARTS AND PROCESS FOR MANUFACTURE OF A MICROVALVE

FIELD OF THE INVENTION

The invention is directed to a microvalve and a process for manufacture of a microvalve and, more particularly, to a microvalve having a closing member made of metal.

BACKGROUND OF THE INVENTION

A microvalve with joined layers of parts is known from German Patent Disclosure DE-OS 42 21 089 which describes a microvalve having three components stacked one on top of another in layers. These components are made of plastic material or aluminum. The closing member of the microvalve is made of a molded plastic that contains metal powder and is constructed of multiple layers. To manufacture that valve, plastic molding processes, in particular injection molding or stamping, are used to form the structure. However, the strength or chemical resistance of the plastics used is not always optimally adapted to some working conditions.

A micromechanical manufacturing process, the so-called LIGA process, is described by Ehrfeld in "The LIGA Process for Microsystems", Micro System Technologies 90, Springer Verlag, Berlin, September 1990, pp. 521 ff.

SUMMARY OF THE INVENTION

One aspect of the present invention is directed to a microvalve comprising a chamber having its sides defined by a chamber wall wherein an inlet is formed in the chamber wall. A diaphragm is fixed at its periphery to the chamber wall and defines a base of the chamber. A valve seat is fixed to the chamber wall opposite the diaphragm, and spaced therefrom. The valve seat has an outlet formed therein. A closing member has one end fixed to the diaphragm and an opposite end engageable with the valve seat to close communication between the inlet and the outlet. The closing member is comprised of two joined metal pieces sized to fit within said chamber.

Another aspect of the present invention is directed to a process for manufacturing a microvalve having a chamber defined in part by a chamber wall, and a diaphragm as its base. A closing member is accommodated within the chamber and fixed to the diaphragm. The diaphragm is secured to a base plate. A moldable material is applied to the diaphragm. A punch is suitably shaped like the chamber wall and the closing member. The punch is pressed into the moldable material to form a first mold portion for the chamber wall and a second mold portion for the closing member. The first and second mold portions are filled with metal which is joined to the diaphragm. The moldable material and the base plate are then removed.

A further aspect of the present invention is directed to a process for manufacturing a microvalve with a closing member which is aligned with a valve seat, and having a valve chamber, in which the closing member is placed, with which the valve seat is firmly joined. A moldable material is applied to a metal base plate. The mold of a valve outlet is impressed into the material with the aid of a suitably shaped first punch. The mold is filled with metal. A sacrificial layer is applied over a region including the valve outlet and its periphery. A second layer of a moldable material is applied and the second layer is molded with a second punch to form a mold of the closing member and a mold of the valve chamber which are filled with metal. The moldable material and the base plate are then removed.

Yet another aspect of the present invention is directed to a process for manufacturing a microvalve. A first metal layer is formed which has a first part of a closing member and a first part of a valve chamber. A second metal layer is formed which has a second part of the closing member that is joined to a valve seat via a sacrificial layer, and which has a second part of the valve chamber. The first and second metal layers are joined to each other by a joining layer, and the sacrificial layer is then removed.

BRIEF DESCRIPTION OF THE DRAWINGS

A preferred embodiment of the invention is shown in the following drawings and described in further detail in the ensuing description.

FIGS. 2.1 to 2.8 depict a sequence of steps in a method for manufacturing a first part of a closing member and a first part of a valve chamber by showing a cross section in different stages of manufacture;

FIGS. 3.1 to 3.8 depict a sequence of steps in a method for manufacturing a second part of a closing member with a valve seat and a second part of a valve chamber by showing a partial cross section in different stages of manufacture.

DETAILED DESCRIPTION

The microvalve of the present invention is made of a chamber the periphery of which is defined by a round chamber wall 1A, a diaphragm 6 defining the base of the chamber, a closing member 18 movably accommodated within the chamber, and a valve seat 1 against which closing member 18 is abuttable.

Figure 1:
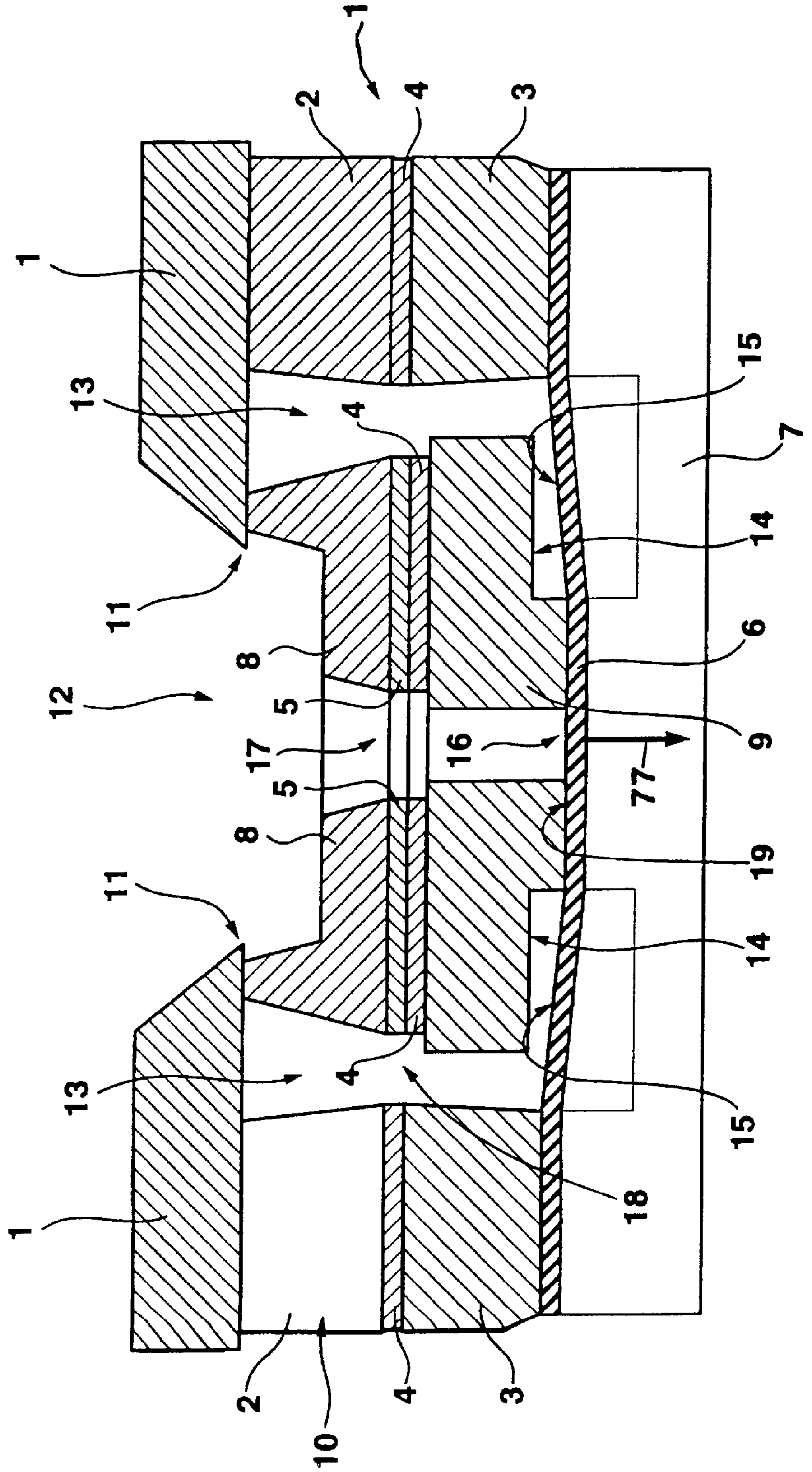
FIG. 1 is a cross section through a circular microvalve.

More particularly, FIG. 1 shows a microvalve having a valve seat 1 embodied as a round, plate-like disk in the center of which there is a round opening for the outlet 12. Chamber wall 1A includes first part 3 and second part 2, and it is fixed between diaphragm 6 and valve seat 1. The second part 2 is fixed to the valve seat. The inside radius of second part 2 is sized such that closing member 18 fits within the inside radius. One surface of first part 3 is fixed to diaphragm 6. The other surface of first part 3 is attached to second part 2 of the valve chamber via a joining layer 4 and, preferably, has the same outer and inner radii as second part 2.

The closing member 18 is fixed to the diaphragm 6 in alignment with the valve seat 1 and within the inner radius of the first and second parts 3, 2 of the chamber wall 1A. The closing member 18 includes a first metal piece 9 which is secured to the diaphragm 6 via a circular face 19. The first metal piece 9 (proceeding in a direction from diaphragm 6 toward the valve seat 1) changes in size from a first circular disk with a first radius into a second circular disk with a second radius. The second radius is larger than the first radius, but smaller than the inner radius of the annular first part 3 of the valve chamber. A disk-shaped joining layer 4 is applied to the circular face of the first metal piece 9, which face is parallel to the valve seat 1. A circular disk-like initial tension layer 5 is applied to the joining layer 4. A second metal piece 8 is located on the initial tension layer 5. The second metal piece 8 comprises a circular disk-like plate, on which an annular flange is formed that acts as a sealing lip when the closing member 18 abuts against the valve seat 1.

An inlet 10 is made in second part 2 of the valve chamber wall 1A. A first adjusting recess 16 is made in the middle of the first metal piece 9. By way of example, it is cylindrical in shape (a conical shape is also possible), and in its lengthwise direction it extends between diaphragm 6 and valve seat 1. In order words, the longitudinal axis of the adjusting recess is oriented at right angles to the plane of the diaphragm. The first adjusting recess 16 has a third radius. A second adjusting recess 17 is made in the second metal piece 8, and it is cylindrical in shape, with a fourth radius. The adjusting recess 17 may also be conical. The fourth radius of the adjusting recess 17 is larger than the third radius of the first adjusting recess 16.

The diaphragm 6 is attached, on the side opposite the closing member 18, to a drive, or actuating, mechanism 7. The diaphragm 6 is under initial tension, in such a way that the closing member 18 is pressed against the valve seat 1. Thus, the microvalve is normally closed.

As can be appreciated from the above, valve seat 1, second part 2 and first part 3 of chamber wall 1A, and diaphragm 6 form a valve chamber in which the closing member 18 is accommodated. The closing member 18 is surrounded by an annular space 13. A fluid under pressure can be supplied to the annular space 13 via the inlet 10. By actuation of the drive mechanism 7, the diaphragm 6 can be moved in the direction away from the valve seat 1, so that the sealing lip of the second metal piece 8 moves away from the valve seat 1, thus communicating space 13 with the outlet 12, is Diaphragm 6 is made of a material, as specified below, that is flexible and can be moved axially in the center even though it is firmly fastened at its periphery.

The first metal piece 9 is secured to diaphragm 6. The first metal piece 9 has an annular disk-like first pressure face 14 which is approximately parallel to diaphragm 6. The diaphragm 6 has an annular disk-like second pressure face 15 opposed to face 14. A pressure acting in space 13 is applied to the first pressure face 14 of closing member 18 and to second pressure face 15 of diaphragm 6 to create oppositely directed forces. A pressure equilibrium on the closing member 18 is attained in this way. Since the diaphragm 6 is fastened on both sides, but the closing member is conversely fastened only on one side, a pressure equilibrium is established by means of the first and second pressure faces 14, 15, which are not of equal size. The pressure equilibrium is achieved not exactly but rather only approximately. It can be shown that for the above-described arrangement, the forces in the direction of the longitudinal axis, which are produced by the hydrostatic pressure of the pressure fluid, are approximately compensated for if the ratio of the radius of the first pressure face 14 to the radius of the second pressure face 15 is approximately 1:2. The advantage of an approximate pressure compensation of this kind is that the force which drive 7 has to exert to open the microvalve is independent of the hydrostatic pressure in the pressure fluid. As long as the residual (i.e. uncompensated) force is small, whether it acts in the closing or opening direction of the microvalve is also insignificant, since the closing of the valve is carried out by the residual stress of the membrane 6, and the opening is carried out by the drive 7. The drive 7 is embodied, for example, as a piezoelectric element which is deformable, and can exert a tensile force 77 on diaphragm 6.

The described form of the microvalve is shown by way of example. For instance, the valve seat 1 may also have a recess of some other shape. The closing member 18 may also be formed without the first and second adjusting recess 16, 17. The closing member 18 may also be rectangular or of some arbitrary other shape. Nor is the annular shape of the first part 3 and second part 2 of the valve chamber necessary. Instead, as an example, the second part 2 and the first part 3 of the valve chamber could take the form of a rectangular frame.

The valve seat has as its outlet 12 preferably a funnel-like shape, with the funnel shape tapering inward toward the closing member. As a result, the edge 11 adjoining the closing member tapers to a point. This provides an improved atomization function such as, for instance, upon injection of fuel through the microvalve.

FIGS. 2.1 to 2.8 depict the steps of a method for manufacturing the first part 3 of the valve chamber wall 1A, the diaphragm 6, and the first metal piece 9 of closing member 18. In FIG. 2.1, a metal base plate 20 is shown, on which a diaphragm 6 is applied by means of electrostatic forces, over an intervening dielectric layer 21. More specifically, electrical charges of opposite polarity are applied to diaphragm 6 and base plate 20. Dielectric layer 21 is required to prevent current flow therebetween, so that an electrostatic attraction is established. The diaphragm 6 is a metal foil. Spring, i.e. resilient, materials such as nickel-beryllium, copper-beryllium, amorphous metals of various composition, or steel are used as the metal foil. Securing of the diaphragm 6 to base plate 20 can also be done with a thin adhesive film or by suction.

A moldable material 22, preferably polymethylmethacrylate (such as PMMA), is applied to the diaphragm 6 in a thickness of approximately 300 micrometers. It is advantageous to use a two-ply plastic (PMMA) as the moldable material 22. A thin ply 24 is applied to the diaphragm 6, and it is optimized with respect to its adhesive properties. A thick ply 23 is applied over the thin ply 24 and it is designed to be easily deformable. The two-ply plastic is schematically shown in FIG. 2.1 by the dashed line.

In FIG. 2.2, the material 22 is shown after being shaped as a mold by a first punch (not shown). With the aid of the first punch, a first mold 26 and a second mold 25 are impressed into the material 22. The first mold 26 is the mold for the first metal piece 9. The second mold 25 is the mold for the first part 3 of the valve chamber. The impressing is done at a temperature of 150° C. and a pressure of 10 to 20 bar, for instance. The removal of the first punch is done at a temperature of 50° C., for instance. The first punch is not pressed all the way onto the diaphragm 6. A residual layer thickness of the material 22 of approximately 10 to 50 micrometers is left on the diaphragm 6. This residual layer is subsequently removed. This is done, for instance, by plasma etching or laser ablation. FIG. 2.3 shows the material 22 after the removal of the residual layer.

Next, in an electroplating step, a first metal layer 28 is applied to those surface areas of the diaphragm 6 from which all the material 22 has been removed. Since for the electroplating step a metal surface is necessary, the application of the first metal layer 28 is effected only up to the height of the first step 22A of the molded material 22. Nickel, iron-nickel, nickel-cobalt or nickel-phosphorus, for instance, is used as the material for the first metal layer 28. Next, an adhesive layer 27, in the form of a thin conductive layer (for instance, a sequence of chromium/copper layers) is applied to the surfaces of the first metal layer 28 and of the molded material 22. The adhesive layer 27 is applied by means of sputtering, for instance. The applied adhesive layer is shown as a broken line in FIG. 2.5.

Next, a second metal layer 29 is applied. This is shown in FIG. 2.6. The second metal layer 29 is made of the same material as the first metal layer 28. In this exemplary embodiment, the second metal layer 29 is about 200 micrometers thick. The second metal layer 29 is ground down by turning on a lathe or being ground down and polished. The resulting structure is shown in FIG. 2.7. As can readily be appreciated, first metal piece 9 of closing member 18 and first part 3 of valve chamber wall 1A are clearly discernible, with both being attached to diaphragm 6.

Next, onto the resultant first metal piece 9 and first part 3, a structured joining layer 4 is applied by an electrochemical process. The structuring is done in a well-known way by photolithography. In this exemplary embodiment, the joining layer 4 is between 5 and 10 micrometers thick and is made of, for instance, lead-tin alloy solder. The photoresist (not shown) and the remaining moldable material 22 are removed by wet-chemical methods. The base plate 20 and the electrostatic layer 21 are also detached from the diaphragm 6. Thus, FIG. 2.8 shows a diaphragm 6 on which an annular part 3 defining part of the valve chamber has been secured. Inside the inner radius of the first part 3 of the valve chamber, a first metal piece 9 is securely joined to the diaphragm 6. A first adjusting recess 16 is made in the first metal piece 9. With the aid of the just-described steps, it is possible to accomplish an exact positioning of the first metal piece 9 inside a valve chamber that is partially defined by the first part 3. In this way, the first pressure face 14 and the second pressure face 15 are located in an exactly defined manner to each other.

FIGS. 3.1 to 3.8 depict different steps for manufacturing a valve seat 1 to which annular second part 2 of the valve chamber is attached. In FIG. 3.1, a metal base plate 20 is shown onto which the same moldable material 22 (PMMA) used above is applied. With the aid of a suitably shaped second punch (not shown), a mold of the valve seat 1 is impressed into the material 22. The second punch leaves a peripheral portion of material 22 used as alignment aid 35, as explained below. Next, by the same type of steps shown in FIGS. 2.2, 2.3 and 2.4, as discussed above, the surface of base plate 20 is exposed in appropriate areas, and the mold is filled with metal with the aid of an electroplating step. Next, the filled metal layer is ground down to a predetermined thickness. The result, as shown in FIG. 3.2, is a base plate 20 on which a valve seat 1 is fixed having an outlet funnel 12 and alignment aid 35, the outlet funnel 12 and alignment aid 35 being filled with material 22.

Next, a resist layer 31 is applied to the valve seat 1. This layer is structured photolithographically and is removed by 3 etching around the periphery of funnel 12. In the region where valve seat 1 has been laid bare by etching, a thin layer is sputtered or vapor-deposited on as a temporary, or sacrificial, layer 32, as shown in FIG. 3.3. The temporary layer 32 comprises titanium, for instance. The sacrificial layer 32 should be as thin as possible. The sealing lip of the closing member 18 should have a surface contour which is as similar as possible to that of valve seat 1. This is assured by a sacrificial layer that is as thin as possible. However, extremely thin sacrificial layers are difficult to etch. An optimum thickness lies between 100 nanometers and 1 micrometer.

Next, a further layer of material 22 is applied to a height of approximately 300 micrometers. The mold 33 for the second metal piece 8 of closing member 18 and the mold 34 for the second part 2 of the valve chamber wall 1A are impressed in the material 22 with the aid of a third forming punch (not shown). The third punch has an alignment protrusion (not shown) which is inserted during the impressing step into the material 22 of alignment aid 35. Exact alignment of the third punch is thus achieved. This is shown in FIG. 3.4.

The third punch is advanced toward valve seat 1 until it leaves a narrow residual layer 32A above predetermined areas of temporary layer 32. This also leaves a further narrow layer 32B closer to the periphery of valve seat 1. Layers 32A and 32B are then removed by plasma etching or laser ablation, and first metal layer 28 is applied in such bared areas by an electroplating step. This is shown in FIG. 3.5. Next, an adhesive layer 27 is applied to the molded material 22 and the first metal layer 28. The adhesive layer 27 represents a metallization, which in a nickel electroplating step preferably comprises a chromium/copper alloy. This is shown in FIG. 3.5. Next, with the aid of an electroplating step, a second metal layer 29 is applied. The second metal layer 29 should be sufficiently thick so that it can be ground down to the level of the second part 2 of the valve chamber; e.g. 110–120% of the level of the second part 2 should be thick enough for this. Layer 29 subsequently ground down to a predetermined thickness. The predetermined thickness is defined by the height of the second part 2 of the valve chamber or of the second metal piece 8 of the closing member. This structure is shown in FIG. 3.6.

A photoresist layer 31 is then applied, which is photolithographically structured in the regions of the second metal piece 8 and then removed by etching. The bared area of the second metal piece 8 is covered with an initial tension layer 5. This is done in an electroplating process, and an adhesive layer may optionally be applied beforehand. The initial tension layer 5 in this example is about 5 micrometers thick. This structure is shown in FIG. 3.7.

Next, after removal of the photoresist 31 and re- structuring photolithographically with a resist layer, a joining layer 4 is applied onto the initial tension layer 5 and the second part 2. The resist layer, the material 22 and the base plate 20 are thereupon removed. Also removed in this step is metal piece 35A formed while metal layer 28 and/or 29 were applied. Since piece 35A is surrounded by material 22, when the latter is removed in this step, piece 35A simply falls out. The result, as shown in is FIG. 3.8, is a valve seat 1 (shown upside-down compared to FIG. 1) onto which an annular second part 2 of a valve chamber is fixed. A second metal piece 8 is accommodated within the inner radius of the second part 2 of the valve chamber. The second metal piece 8 is firmly joined to the valve seat 1 via a temporary layer 32, and the second metal piece 8 is aligned with respect to the outlet funnel 12 of the valve seat 1. By using a stamping punch in the manner described above, exact positioning of the second metal piece 8 with respect to the annular second part 2 of the valve chamber is assured.

Figure 4:
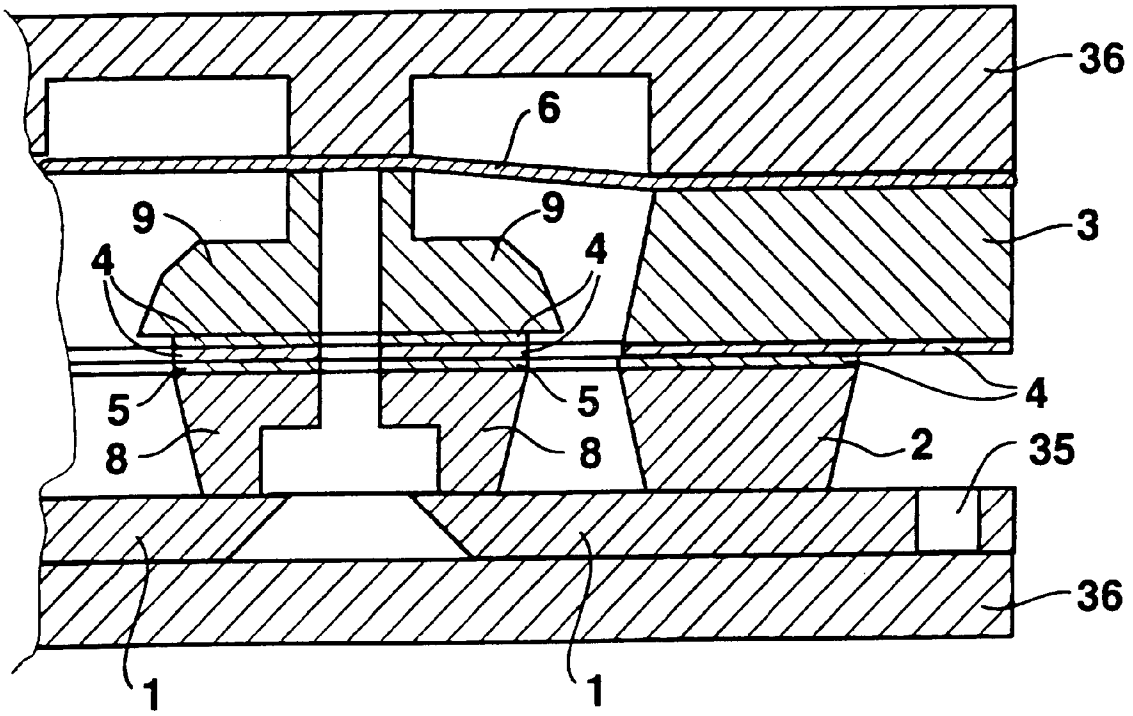
FIG. 4 shows how the parts are joined to each other for manufacturing a microvalve in accordance with the invention.

FIG. 4 shows the assembled components of a microvalve of the two parts shown in FIGS. 2 and 3. The first metal piece 9 and the second metal piece 8, and the first part 3 of the valve chamber and second part 2 of the valve chamber, are aligned exactly with one another. This can be done, for instance, via the first adjusting recess 16 and the second adjusting recess 17. The adjustment is carried out by moving one of the two layers until the adjustment recesses are aligned with each other. Next, with the aid of a joining tool 36, the parts are pressed together to bind the joining layers 4 to each other at a pressure and a temperature that are determined based on the composition of the joining layers. The part of the joining tool 36 that contacts the first metal piece 9 and first part 3 is formed such that a defined initial tension is imparted to the diaphragm 6 in the joining process. The joining layers 4 of the first and second metal pieces 9, 8 bind to each other, producing the closing member 18 from the two joined-together parts. The first part 3 and second part 2 of the valve chamber 1A are joined together via corresponding joining layers 4 as well.

Next, the temporary layer 32, placed between the second metal piece 8 and the valve seat 1, is removed with the aid of an etching process.

When the valve parts are pressed together by the joining tool 36, the diaphragm 6 is deflected. The magnitude of diaphragm deflection is determined by the construction of the joining tool. The joining tool 36 is embodied such that the predetermined magnitude of diaphragm deflection is equivalent to the thickness of the initial tension layer 5. During the joining process, the joining medium of the joining layer 4 is briefly in a deformable state. In that phase, dimensional deviations, for instance in the thickness of the initial tension layer 5, and various layers of roughness are balanced out within certain limits. This is made possible by suitably varying the total thickness of the joining layer 4.

The size of the area that is covered with the joining layer 4 must be adapted in relation to the joining parameters (e.g. pressure, temperature) in such a way that only just enough joining medium is used to bind the layers and so that no joining medium can drip onto the diaphragm 6.

Next, the joining tool 36 is removed, and a drive mechanism 7 is secured to the diaphragm 6, such as with an adhesive. The specific way this is done depends on the type of drive mechanism 7 which is used.

In this way, with the aid of a simple process, a metal microvalve is made. The first, second and third punches are manufactured by way of example with the aid of the lithographic galvanic molding process (LIGA) or by precision-mechanical processes. Another process for manufacturing the first, second and third punch comprises making them by the methods of FIG. 2 or FIG. 3, with the aid of an impressed material 22.

The microvalve made according to the present invention has the advantage over the prior art that the closing member is made of metal. As a result, the closing member has all the positive properties of metal. For instance, the closing member has the thermal expansion coefficient of metal, is ductile, and can be manufactured economically. Another advantage is that the closing member is made of up to two pieces of metal. FIGS. 2.1 to 2.8 show how one layer of parts is made which forms one set of first metal piece 9 and first part 3 joined to diaphragm 6 for manufacturing one microvalve. However, the layer can be made with a plurality of such sets. Likewise, the set of parts shown in FIGS. 3.1 to 3.8 for manufacturing one microvalve can be made in a layer along with a plurality of such sets. Thus, with suitably formed layers of parts, it is possible, by joining together two layers, to complete the manufacture of a number of such microvalves simultaneously in a single step. An additional advantage of the microvalve is that vertical tolerances of the joining or connecting steps for the components does not impair the function of the microvalve.

The method according to the invention has the advantage over the prior art that a microvalve or parts of a microvalve can be manufactured economically and simply of metal. In accordance with this method, the closing member is securely fixed to a metal diaphragm. The connection between the closing member and the diaphragm can thus withstand heavy loads. Moreover, the method employs an economical stamping process which also offers the advantage that exact alignment of the closing member with the valve seat is done without taking active adjustment steps. Because of the sacrificial layer 32 being as thin as possible, the valve seat and the closing member have the same surface structure. Because of this improved form fitting, the valve closes in a particularly tight manner. All the critical dimensions are defined by punches, which can be manufactured with precision and then can reproducibly manufacture the microvalve components accordingly.

It is especially advantageous to form the microvalve as a pressure-equalized microvalve. The pressure equilibrium is established between one face of the diaphragm and one face of the closing member. Since the closing member is securely fixed to the diaphragm, pressures that act upon the closing member and the diaphragm are equalized. Therefore, the forces needed to open and close the microvalve are substantially independent of the hydrostatic pressure in the fluid which occupies space 13.

The diaphragm is preferably made of a metal foil. It is also advantageous to make the valve chamber wall of the microvalve in which the closing member is accommodated from two joined-together parts of metal. In this way, the valve chamber can be made very sturdy and it can be manufactured economically, since the respective components of the valve chamber wall and the closing member are joined together simultaneously.

It is advantageous to embody the valve seat such that the edge of the valve seat closest to the closing member is an edge that tapers to a point. Increased atomization of the pressure medium is attained as a result. This is especially advantageous when the microvalve is used as an injection valve in a motor vehicle. Preferably, the metal fragments and/or metal pieces of the microvalve should be joined solidly together via a joining layer. The total height of the microvalve or of the closing member is not defined by the joining process but, rather, by the height of the respective layers of parts or via the grinding and/or polishing steps.

The process for manufacturing the metal valve chamber and the metal closing member is improved by creating the molds with a stamping process in such a way that a punch is pressed into the moldable material toward the diaphragm only as far as a predetermined distance, and the residue of the moldable material is removed with the aid of a plasma etching process or laser ablation. This assures that there will be no further residue of the moldable material in those regions of the diaphragm in which metal is to be applied.

The filling of the mold with metal is done in three process steps. As a first process step, which is an electroplating step, a first metal layer is applied above an adhesive layer. Next, in a second process step, an adhesive layer is applied to the molded material. This makes it possible to deposit a second metal layer onto the molded material. Finally, in a third process step, which is again an electroplating step, a second metal layer is applied which is subsequently ground down to a suitable height.

The relative height between the valve chamber and the closing member is adjusted via the thickness of the initial tension layer, in combination with the joining tool or joining process, in order to place the diaphragm in tension. It is preferable to apply to the closing member a layer for producing this defined initial tension in the diaphragm. As a result, after the joining step and after the temporary layer has been etched off, an initial tension of the diaphragm in the closed state is attained.

For the sake of better alignment of multiple punches, it is advantageous to stamp an alignment mark with the aid of one punch so that another punch can be aligned with the alignment mark.

It is especially advantageous to produce a microvalve of two parts which have been manufactured by the method of the invention. A first part of a closing member is joined to a second part of a closing member via a joining layer, and a first part of a valve chamber is joined to a second part of a valve chamber via a joining layer, and then the temporary layer, which is located between the valve seat and the second part of the closing member, is removed. In this way, with the aid of a single joining process, a metal microvalve is manufactured in which the joining face is not stressed by a tensile strain caused by the imposition of pressure. The manufacturing process is simple and economical. The joining process is also suitable for a full-wafer process, i.e. a plurality of first parts of a closing member and a plurality of first parts of a valve chamber are located on a first wafer, and a plurality of second parts of a closing member with a valve seat and a plurality of second parts of a valve chamber are located on a second wafer. These wafers are then joined together with the aid of the joining process described. Simple manufacture of multiple microvalves is thus possible with the aid of a joining process.

Although preferred embodiments of the invention have been described in detail above, various modifications hereto will be readily apparent to one with ordinary skill in the art. All such modifications are intended to fall within the scope of the invention as defined by the following claims.

I claim:

1. A process for manufacturing a microvalve having a chamber defined by a chamber wall and a diaphragm (6) defining a base of the chamber, and wherein a closing member (18) is accommodated within the chamber and fixed to the diaphragm, comprising the steps of:

securing the diaphragm to a base plate;

applying a moldable material to the diaphragm;

providing a punch having a shape of the chamber wall and of the closing member;

pressing said punch into the moldable material to form a first mold portion corresponding to the chamber wall and a second mold portion corresponding to the closing member;

filling said first and second mold portions with metal which is fixed to the diaphragm to form the chamber wall and the closing member; and removing said moldable material and said base plate.

2. The process of claim 1, wherein the punch, in the regions in which the closing member (18) is fixed to the diaphragm (6), is pressed close to the diaphragm (6) to leave a residue of the material (22), and the residue is removed with the aid of plasma etching or laser ablation.

3. The process of claim 1, wherein after the step of pressing the punch to form the first and second mold portions, a first metal layer (28) is applied by a galvanizing process; an adhesive layer (27) is next applied onto the molded material (22); a second metal layer (29) is then applied by a galvanizing process; and then the second metal layer (29) is removed down to a predetermined height.

4. The process of claim 1, wherein said first mold portion is shaped for a first part (3) of the valve chamber and said second mold portion is shaped for a first part (9) of the closing member.

5. A process for manufacturing a microvalve with a closing member (18), which is aligned with a valve seat (1), and having a valve chamber, in which the closing member (18) is accommodated, and with which a valve seat (1) is firmly joined, comprising the steps of: applying a moldable material (22) onto a metal base plate (20); impressing the mold of a valve outlet (12) into the moldable material (22) with a first punch; filling the mold with metal; applying a sacrificial layer (32) over a region including the valve outlet (12) and its periphery; applying a second layer of a moldable material (22); molding the second layer with a second punch to form a first mold portion (33) in the shape of the closing member and a second mold portion (34) in the shape of the valve chamber; filling the first and second mold portions (33, 34) with metal; and removing the moldable material (22) and the base plate (20).

6. The process of claim 5, wherein an initial tension layer (5) is applied onto the closing member (18).

7. The process of claim 5, wherein an adjusting groove (35) is made in the valve seat (1).

8. The process of claim 5, wherein said second mold portion is shaped for a second part (2) of the metal valve chamber and the first mold portion is shaped for a second part (8) of the closing member.

9. A process for manufacturing a microvalve comprising the steps of:

forming a first metal layer which has a first part (9) of a closing member and a first part (3) of a valve chamber;

forming a second metal layer which has a second part (8) of a closing member that is joined to a valve seat (1) via a sacrificial layer (32), and which has a second part (2) of a valve chamber;

joining the first and second metal layers to each other by a joining layer (4); and removing the sacrificial layer (32).

* * * * *